US005416597A

United States Patent [19]

Mubaslat

[11] Patent Number: 5,416,597

[45] Date of Patent: May 16, 1995

[54] SYSTEM AND TECHNIQUE FOR DAMPING ENGRAVING HEAD RINGS

[76] Inventor: Saed M. Mubaslat, 4105 Executive Dr., Dayton, Ohio 45430

[21] Appl. No.: 980,353

[22] Filed: Nov. 23, 1992

[51] Int. Cl.[6] .......... H04N 1/21; B41C 1/02

[52] U.S. Cl. .......... 358/299

[58] Field of Search .......... 358/299; 409/208; 346/108, 139 R; 318/605, 606, 611, 629, 652, 671; 364/474.02, 474.35

[56] References Cited

U.S. PATENT DOCUMENTS 3,769,455 10/1973 De Vos et al. .......... 358/299
4,052,739 10/1977 Wada et al. .......... 358/299
4,450,486 5/1984 Buechler .......... 358/299
4,451,856 5/1984 Buechler .......... 358/299
5,029,011 7/1991 Fraser .......... 358/299
5,036,403 7/1991 Hupka et al. .......... 358/299

*Primary Examiner*—Benjamin R. Fuller
*Assistant Examiner*—Eric Frahm

[57] ABSTRACT

A system and method for canceling the effects of oscillation in an electromechanical engraving system which has a tendency to ring or vibrate, producing ghost images displaced from a main image, uses a pulse application technique. The variables affecting vibration may be continuously monitored, or set to predetermined pulse values, and the vibration is then predicted based on these variables. Pulses are then applied in a sequence to eliminate different harmonics of each vibration.

28 Claims, 3 Drawing Sheets

SYSTEM AND TECHNIQUE FOR DAMPING ENGRAVING HEAD RINGS

BACKGROUND OF THE INVENTION

The present invention relates to engraving machines and, more particularly, to a circuit arrangement for canceling the effects of oscillation in an electromechanical engraving system.

The basic principle of electro-mechanical engraving of a gravure cylinder involves rotating a copper plated cylinder while actuating an electrically driven tool which cuts or engraves cells or lines into the copper surface. The engraved cylinder is normally used in a web type gravure printing press for printing paper, plastic, or metallic film material.

In the gravure printing process, the engraved cylinder is flooded with ink. A doctor blade wipes off excess ink from the surface so that only the engraved cells contain ink which is transferred to the material being printed. To obtain a high quality print, it is necessary that the cells be very accurately placed or located on the cylinder surface, usually within one to two microns of the desired theoretical location. The depth of the engraved cells must also be accurately controlled since the depth determines the amount of ink transferred which, in turn, determines the shade of gray in a black-white print. In a color print, the amount of ink transferred to the paper or material is even more critical, since colors are mixed to produce various shades of all possible colors. A slight variation in the desired amount of ink affects not only the darkness of the color but, more importantly, the production of the desired color tone.

The cutting tool used to engrave the cells is normally a pointed diamond stylus. The tool must make many cells in a cylinder and, therefore, must be operated at a very high speed. For example, in a typical 140 line screen, about 20,000 cells per square inch are required. More than 100 million cells are frequently required for a single gravure printing cylinder. Even with a forming rate of 3,000 to 4,000 cells per second, several hours of time may be required to engrave a single cylinder. Such a high cell forming rate introduces serious problems of high acceleration forces with resulting torsional and transverse or lateral vibrations. It is also necessary to make rapid transfer from black to white (full cells to no cells) or white to black. This also introduces transients causing serious torsional and transverse vibrations.

One problem with electromechanical engraving systems, then, is that there is a strong tendency for the mechanical stylus holder and its spring support system to "ring" or vibrate, thereby producing "ghost" images which are displaced from the main image. This greatly reduces the quality of the printing, especially for small type, and dampening means must be used in a form which does not introduce hysteresis.

Electromechanical systems used in engraving machines are subject to step current or torque response, and the systems experience vibrations. The resonant characteristics of an engraving system and the non-linearities are associated with many factors. Changes in the copper hardness, which is the media on which the engraving is normally done, magnetic saturation, movements in non-intended directions of displacement, non-linearities in the materials composing the systems, and excitations upon the impact of the solid diamond or other cutting devices on the engraving head with a solid media on which engraving is achieved, are all factors which contribute to undesired vibrations. Generally, the linear oscillations are predictable from the system characteristics including spring constants, damping coefficients, inertias, and torques. Notch filters and damping techniques are effective in reducing these oscillations. Characteristics of all dampening materials change as they absorb energy due to self-heating. They are therefore inherently unstable in their dampening characteristics. In more complex systems with multiple resonant points in association with other non-linearities, filtering and damping techniques alone are not sufficient and, in many cases, the response of the system or the rise time will suffer.

It is therefore highly desirable and an object of the present invention to provide a system and technique to eliminate mechanical ring or vibrations in electromechanical systems used in engraving machines.

SUMMARY OF THE INVENTION

The present invention applies electric pulses as a single technique or in association with other filtering and damping means to eliminate mechanical ring or vibrations in such systems.

In accordance with one embodiment of the present invention, a method for canceling the effects of oscillation in an electromechanical engraving system comprises the steps of: continuously monitoring variables affecting ring or vibration; predicting the vibration based on the vibration-affecting variables which are being monitored; and synchronously applying pulses in a sequence to eliminate different harmonics of each ring or vibration. In a preferred embodiment of the present invention, the method for canceling the effects of oscillation may further comprise the step of enhancing rise time.

It is an object of the present invention to eliminate mechanical vibrations in electromechanical systems used in engraving machines. It is a feature of the present invention that not only does the present invention prevent slowing down of the rise time, it can actually speed up the rise time, and then damps the vibration as it occurs. Finally, it is an object of the present invention to provide a pulse technique for damping engrave head vibration, resulting in easier and more stable head tuning.

Other objects, features and advantages will become more readily apparent in the following description when taken in conjunction with the appended drawings.

In the drawings as hereinafter described, a preferred embodiment is depicted; however, various other modifications and alternative constructions can be made thereto without departing from the true spirit and scope of the invention.

DETAILED DESCRIPTION OF THE PREFERRED EMBODIMENTS

Figure 1:
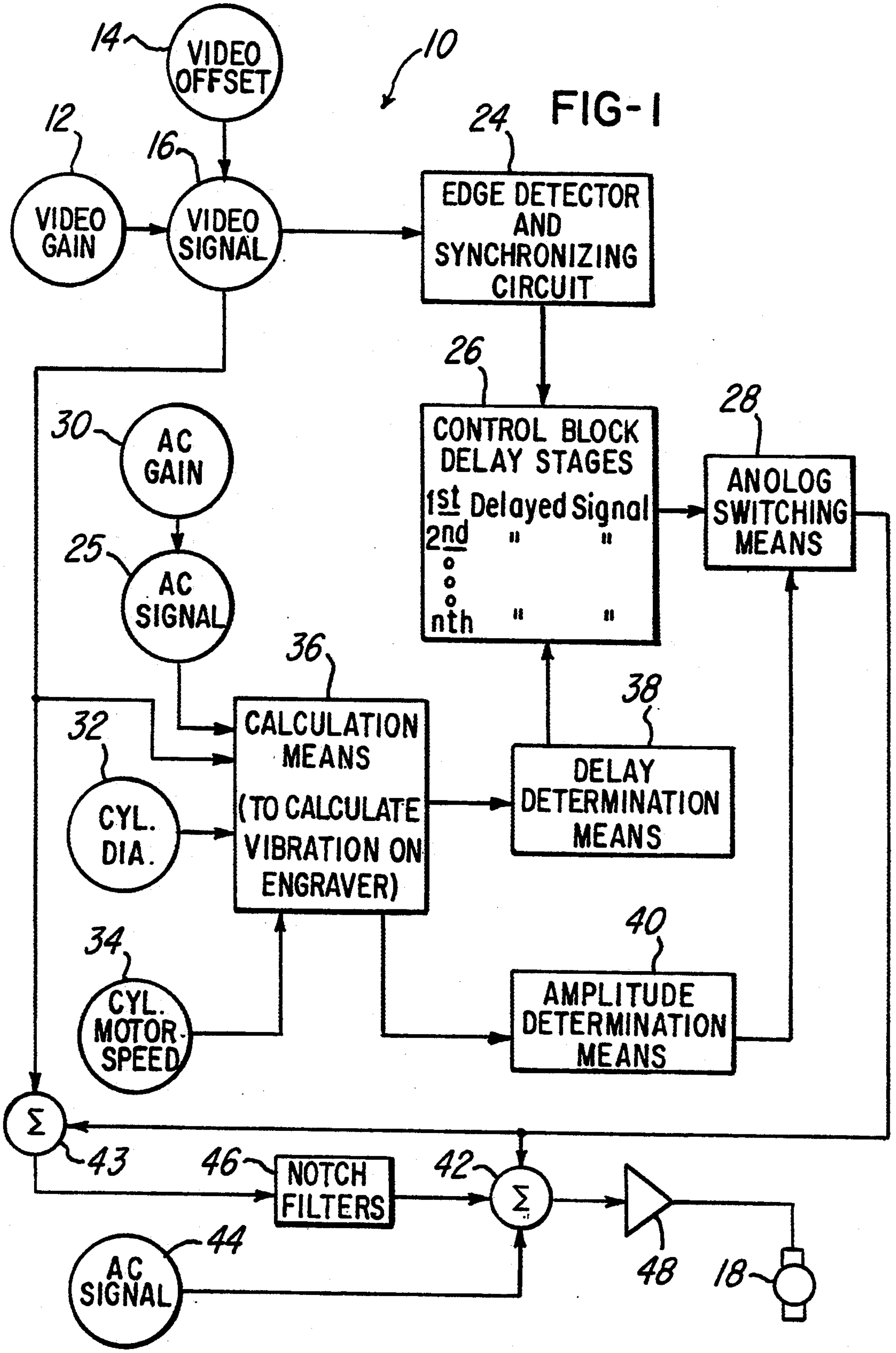
FIG. 1 is a schematic block diagram of a pulse circuit for eliminating vibration of an engrave head, in accordance with the present invention.
Figure 2A:
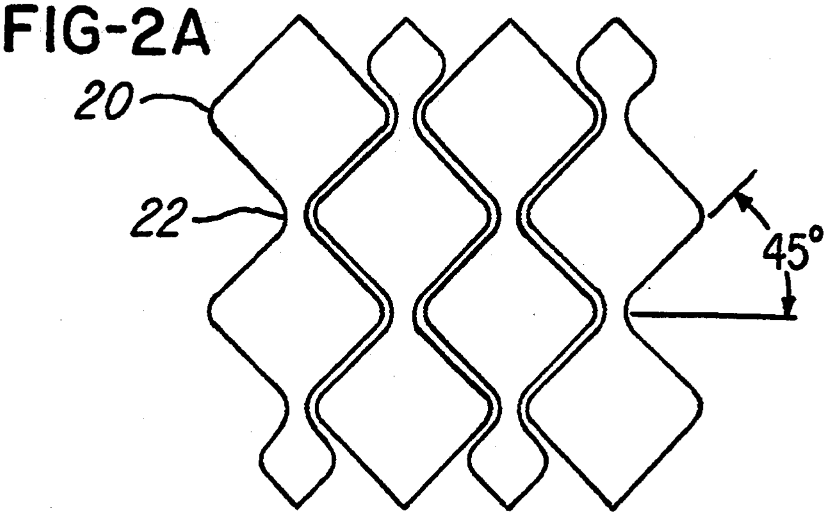
FIGS. 2A, 2B, and 2C, illustrate gravure screens for normal cells, compressed cells, and elongated cells, respectively.

Referring now to the drawings, in FIG. 1 there is illustrated a schematic block diagram of a pulse circuit 10 for eliminating mechanical ring or vibration in electromechanical systems used in engraving machines. In FIG. 1, a video gain 12 and a video offset 14 are applied to a video signal 16, for affecting current applied to a vibrating engraver head 18, thereby affecting cell 20 size and channel 22 size, illustrated in FIGS. 2A, 2B, and 2C. The video signal 16 is applied to an edge detector and synchronizing circuit 24 for creating a digital signal in phase with the video signal 16. The video signal 16 is preferably an analog eight-bit resolution signal which is updated by a track and hold circuit, at four times the frequency of an AC signal 25. This generates a step signal that settles at one of 256 levels for each $\frac{1}{4}$ cell.

The digital signal from block 24 is applied to a control block 26, where delay stages are applied according to the desired number of pulses. Delay stages may be accomplished by any suitable means, including digital or analog. For example, the delay stages may be applied by a counter in a microprocessor, or by a discrete circuit having a counter. In a preferred embodiment, the delay stages are applied using an analog means, where the video signal 16 is applied to an RC circuit to change the rise time of the video signal by the time constant of the RC circuit. The RC filtered signal is then applied to a level detector, which reacts according to the rise time. The control block 26 then outputs the final digital pulses with variable delays and widths to an analog switching means 28. Various other signals may also be applied to the analog switching means 28, which outputs pulses with variable delays, widths, and amplitudes. The analog switching means may be any suitable switch, such as a transistor.

Continuing with FIG. 1, the engraver head 18 rings or vibrates in the engraving system. Variables affecting vibration of the engraving head 18 may be monitored, or provided with predetermined values, in order to determine pulses to be applied to eliminate the ring or vibration. These variables include the AC current signal 25, to which is applied an AC gain 30. The video signal 16 is also monitored or provided with predetermined values. For a square wave signal, the bottom of the square wave is a white current, and the top of the square wave is a black current. Changing the video gain 12 will affect both the black and the white current in the same manner. That is, both the black and the white current either increase or decrease. Conversely, changing the video offset 14 affects the black and white currents oppositely. That is, either the black current increases and the white current decreases, or the white current increases and the black current decreases. The sum of the AC current signal 25 and the video signal 16 provides a determination of the depth to which the cell 20 will be cut, which cell depth is illustrated in the graph shown in FIG. 3, as the vertical axis.

Continuing with FIG. 1, the variables to be monitored or provided with predetermined values may further include a cylinder diameter value 32, and a cylinder motor speed value 34. All of the variables are applied to a calculation means 36 for calculating vibration upon the engraving as the diamond stylus of the engraving head 18 starts hitting the engraving media, such as copper, upon which the engraving is done.

Looking at the ratio of the AC gains to the DC gains allows for the prediction of cell geometry. As the cells 20 are compressed, as in FIG. 2B, more power must be applied to the cell depth. The AC current signal 25 affects the size of the channel 22 as well as the size of the cell 20. In addition, the ratio of AC to DC gives an indication of how much actual energy is lost to vibration and copper media reaction. Since the application of AC and DC signals affects the channel 22 width and the cell 20 size, it is desirable to monitor the AC signal 25 (i.e., to provide a measure of the amount of AC being provided, as well as the ratio of the AC signal to the DC signal), to determine the channel size and cell geometry. When the determination of channel 22 size and cell. 20 size does not correspond to the expected channel size and cell geometry, the difference is the energy lost by the stylus striking the engraving, or copper, media. The energy lost as the stylus strikes the engraving media will therefore vary depending on variations in the hardness of the media, and such variations will be monitored through monitoring of the AC and DC signals.

Figure 2B:
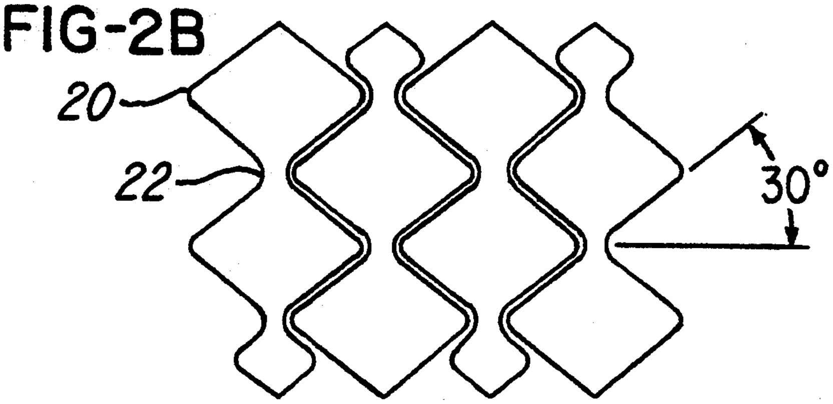
Figure 2C:
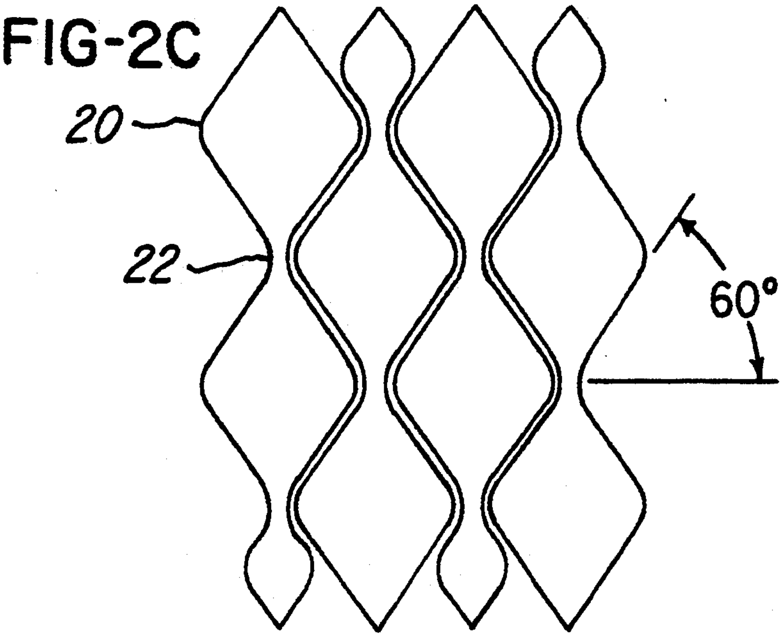

The cylinder diameter value 32 and the cylinder motor speed value 34 are optional variables which can be used to determine the surface speed, which is also a parameter in determining the screen to be cut. The screen chosen affects vibration of the engraving head. Each screen has its own known vibration, so the vibration can be determined from the specific screen used. The cylinder diameter 32 provides the diameter of the cylinder on which the desired image will be engraved. As the drive motor (not shown) for rotating the cylinder rotates while engraving, the motor speed can be changed depending on the screen which is being cut. The cylinder diameter value 32 multiplied by the cylinder motor speed value 34 provides the cylinder surface speed, and it is desirable to hold that constant at a specific screen. If the surface speed is changed, then the shape of the cell changes. For example, if the rotational speed of the cylinder is reduced while maintaining a constant horizontal speed and cell rate, then the cell will compress, as shown in FIG. 2B. Conversely, if the rotational speed of the cylinder is increased while maintaining a constant horizontal speed and cell rate, then the cell will be elongated, as illustrated in FIG. 2C. The cylinder diameter and speed indirectly give an indication of cell geometry, from which vibration can be determined. As will be obvious to those skilled in the art, other variables and means may be used to affect vibration, without departing from the scope and spirit of the invention.

Once the calculation means 36 calculates the ring or vibration on the engraving media, the vibration calculation is used by a delay determination means 38 to determine the amount of delay in the pulses, which controls the pulses, phases, and widths. The pulse delays are then sent to the control block 26 which outputs digital pulses with variable delays and widths to the analog switching means 28.

The vibration calculation 36 is also used by an amplitude determination means 40 to determine positive and negative amplitudes of pulses. The amplitude determination means 40 controls the analog switching means 28, which has the digital pulses supplied therethrough, to affect the pulse amplitudes. Then the output of the analog switching means 28, which provides pulses with variable delays, widths, and amplitudes, is now input to a first summing means 42 or a second summing means 43.

The pulse technique of the present invention, as illustrated by the block diagram of the pulse circuit 10 of FIG. 1, can use electric pulses exclusively, or in association with other filtering and damping means, to eliminate vibrations of the engraver head 18. Consequently, the analog switching means 28 output can go directly to the first summer 42, where the electric pulses are used exclusively for canceling the effects of oscillation in the engraving system, or the analog switching means 28 output can go to the second summer 43. At first summer 42, the pulses with variable delays, widths and amplitudes are summed with a second AC signal 44 and a filtered video signal from a notch filter block 46. Alternatively, at second summer 43, the pulses with variable delays, widths and amplitudes are summed with the video signal 16, and then processed through notch filters at notch filter block 46, to eliminate resonant frequencies or other noise harmonics, With the notch filters, fewer pulses are needed to achieve the vibration elimination. After being processed through the notch filters at block 46, the pulses and video signal summation as processed through the notch filters, are summed with the AC signal 44 at first summer 42. The output of first summer 42 is then applied to a power amplifier 48. The output of the power amplifier 48 is the sum of the desired engraving signal and electric pulses applied to the engraver head 18 to eliminate vibration of the head 18.

Figure 3:
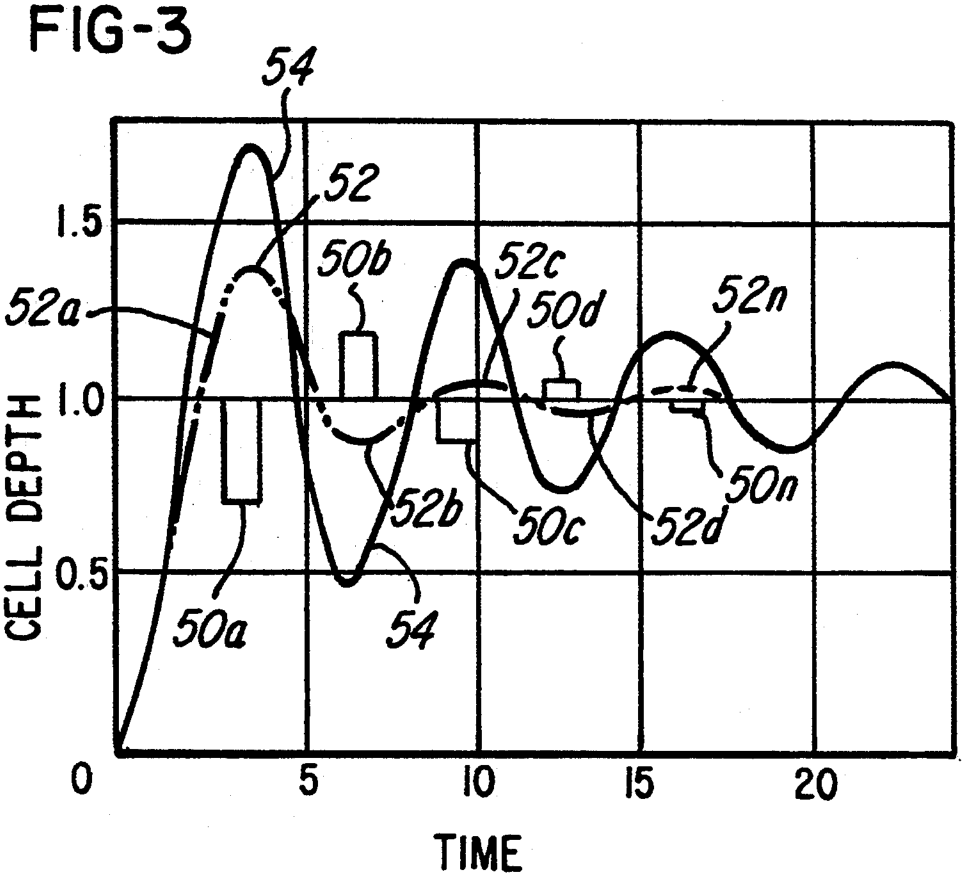
FIG. 3 is a graphical representation of the effect of the pulse technique of FIG. 1 on engrave head vibration.

Referring now to FIG. 3 and continuing with FIG. 1, electric pulses 50 are applied to eliminate vibration of the head 18, in accordance with the pulse technique of the present invention as achieved by the pulse circuit 10 of FIG. 1. The graph in FIG. 3 illustrates the effect of pulses 50 on the cell depth as a response to a step torque applied to the engraving head shaft. The horizontal axis of FIG. 3 represents time dimensions, and the vertical axis of FIG. 3 represents cell depth measurements.

As previously explained, in electromechanical systems used in engraving machines and that are subject to step current or torque response, the systems experience ring or vibration. Pulses 50 accurately placed at positions corresponding to undesired oscillations 52, indicative of head 18 vibration, are extremely effective in eliminating such vibrations. These pulses 50 have an energy content that will cause the response of the system to oppose the direction of the oscillation and cancel it. To achieve a perfect cancellation, the pulses 50 are applied in association with the synchronizing circuit 10 of FIG. 1 that controls the phases of the pulses 50 with respect to the oscillation 52, as well as the widths and amplitudes of the pulses 50.

Continuing with FIG. 3, the pulses 50 are applied in a direction opposite to the vibration of the head 18. Applying each pulse in the opposite direction of the vibration rapidly reduces the vibration, until the pulses being applied, and the vibration, decrease to zero amplitude. Oscillation 54 is representative of a naturally diminishing oscillation, while oscillation 52 is representative of the more rapidly diminishing oscillation when pulses 50 are applied. Rather than wait for the vibration to reduce naturally, the pulses 50 are strategically applied to increase the rapidity of vibration reduction. For example, pulse 50*a* has a large amplitude, as compared to pulse 50*n*, to affect the initially large amplitude of the oscillation 52*a*. The next applied pulse, pulse 50*b*, can have a smaller amplitude than pulse 50*a*, because the corresponding oscillation 52*b* is reduced, as compared to the oscillation 52*a*, by the pulse 50*a*. Pulses of diminishing amplitude, as illustrated by pulses 50*c* and 50*d*, are applied to the rapidly diminishing oscillations 52*c* and 52*d*, until the last pulse to be applied, pulse 50*n*, has eliminated the head 18 vibrations by eliminating the oscillations to zero amplitude.

The number of pulses 50 to be applied may depend on the oscillation output, which is monitored by continuously monitoring the variables affecting vibration of the engraver head 18, or may be set to previously determined preset values. The ring or vibration can be predicted based on the monitoring of the variables affecting the vibration. The pulses 50 are then applied to eliminate the different harmonics of each oscillation 52.

As will be obvious to those skilled in the art, the shapes of the pulses 50 can also be altered for a perfect match with the oscillation 52 in both phase and energy content. Changing the amplitude and/or width and/or phasing (i.e., the positioning or delay) of the pulses 50 will also affect the corresponding oscillation 52 amplitude. Naturally, the shape of the pulses 50 can affect the number of pulses 50 used to eliminate the vibration of the engraver head 18.

As illustrated in FIG. 1, the pulses could also be processed through notch filters 46 to eliminate the harmonics that may excite the resonant peaks of the system. The pulse technique of the present invention dampens the noise without affecting the response or the rise time of the system. In addition to eliminating the undesired vibrations, the pulses can also be used to improve upon the response and rise time of the system. That is, not only does the rise time not slow down, but the pulse technique of the present invention can actually enhance the rise time.

It is seen from the foregoing, that the objectives of the present invention are effectively attained, and, since certain changes may be made in the construction set forth, it is intended that matters of detail be taken as illustrative and not in a limiting sense.

What is claimed is:

1. A method for increasing a rapidity of decay of an undesired mode of vibration of an engraving head in an electromechanical engraving system, the method comprising the steps of:
   - deriving predicted modes of vibration using a stream of information related to a variable affecting the undesired mode of vibration; and
   - generating pulses in a sequence out of phase with each of said predicted modes of vibration to increase the rapidity of decay of the undesired mode of vibration.

2. A method as recited in claim 1 further comprising the step of:
   - continuously monitoring the variable affecting the undesired mode of vibration to provide the stream of information related to that variable.

3. A method for canceling effects of oscillation in an electromechanical engraving system having an engraving head which has a tendency to vibrate and produce ghost images displaced from a main image by applying pulses in a sequence to eliminate different harmonics of each vibration;
   - the method comprises the steps of:
   - continuously monitoring variables affecting vibration; and
   - deriving a predicted vibration based on the variables; further wherein the variables affecting vibration comprise:
   - an amplitude of a video signal;

a hardness of an engraving medium; and a size and depth of cells formed on the engraving medium.

4. A method as recited in claim 1 further comprising the step of:

providing a predetermined value of another variable affecting the undesired mode of vibration for use in deriving the predicted modes of vibration.

5. A method as recited in claim 1 wherein the step of generating pulses comprises the step of generating said pulses in a direction opposite each of said predicted modes of vibration.

6. A method as recited in claim 1 wherein an amplitude of the pulses is variable.

7. A method as recited in claim 1 wherein a width of the pulses is variable.

8. A method as recited in claim 1 wherein a phasing of the pulses is variable.

9. A method as recited in claim 1 wherein the pulses are generated in a sequence which enhances a rise time of a step response of the engraving head to a video signal which affects a pattern for engraving by the engraving head.

10. A method as recited in claim 1 further comprising the step of processing the pulses through one or more notch filters.

11. A pulse circuit for increasing a rapidity of decay of an undesired mode of vibration of an engraving head in an electromechanical engraving system, the pulse circuit comprising:

calculation means for receiving a signal relating to a variable affecting the undesired mode of vibration and deriving a predicted mode of vibration; and a control circuit for generating pulses in a sequence out of phase with the predicted mode of vibration to increase the rapidity of decay of the undesired mode of vibration.

12. A pulse circuit as recited in claim 11 further comprising:

means for continuously monitoring the variable affecting the undesired mode of vibration to provide the signal related to that variable.

13. A system for canceling effects of oscillation in an electromechanical engraving system having an engraving head which has a tendency to vibrate and produce ghost images displaced from a main image, the system comprising:

a pulse circuit for applying pulses a sequence to eliminate different harmonics of each vibration;

means for continuously monitoring variables affecting vibration; and means for deriving a predicted mode of vibration based on the variables;

further wherein the variables affecting vibration comprise:

an amplitude of a video signal;

a hardness of an engraving medium; and a size and depth of cells formed on the engraving medium.

14. A pulse circuit as recited in claim 11 further comprising:

means providing a predetermined value for another variable affecting the undesired mode of vibration to said calculation means.

15. A pulse circuit as recited in claim 11 wherein the control circuit generates each pulse in a direction opposite a direction of the predicted mode of vibration.

16. A pulse circuit as recited in claim 11 including means for controlling an amplitude of the pulses.

17. A pulse circuit as recited in claim 11 including means for controlling a width of the pulses.

18. A pulse circuit as recited in claim 11 including means for controlling a phase of the pulses.

19. A pulse circuit as recited in claim 11 wherein the control circuit is capable of enhancing rise time of a step response of the engraving head to a video signal which affects a pattern for engraving by the engraving head.

20. A pulse circuit as recited in claim 11 wherein the control circuit comprises at least one notch filter through which the pulses may be processed.

21. A method as recited in claim 1 including the additional step of summing the pulses and a video signal which effects a pattern for engraving by the engraving head.

22. A method as recited in claim 21 including the additional step of removing a band of frequencies from a resultant generated from said summing of the video signal and the pulses.

23. A method as recited in claim 1 wherein the predicted modes of vibration are derived from a stream of information related to power required to drive the engraving head.

24. A method as recited in claim 1 wherein the predicted modes of vibration are derived from a stream of information related to ratios of an AC signal and a video signal.

25. A method as recited in claim 1 wherein the predicted modes of vibration are derived by comparing a predetermined signal with a function of at least one of a video signal and an AC signal.

26. A pulse circuit as recited in claim 11 including:

means for receiving a video signal which affects a pattern for engraving by the engraving head; and delay means for receiving a delay determination signal and also for generating the pulses by altering the video signal in response to the delay determination signal.

27. A pulse circuit as recited in claim 26 including an analog switch for receiving an amplitude determination signal related to the predicted mode of vibration and altering amplitudes of the pulses in response to the amplitude determination signal.

28. A pulse circuit as recited in claim 11 including a summer for generating a signal resultant from the pulses and a video signal which affects a pattern for engraving by the engraving head.

* * * * *